3,152,106
POLYMERIZATION PROCESS USING A
ZIEGLER TYPE CATALYST
Simon Mostert, Amsterdam, Netherlands, assignor to Shell Oil Company, New York, N.Y., a corporation of Delaware
No Drawing. Filed Nov. 19, 1962, Ser. No. 238,785
Claims priority, application Netherlands, Nov. 30, 1961, 271,935
2 Claims. (Cl. 260—93.7)

The invention relates to an improved vapor phase process for polymerizing olefinically unsaturated hydrocarbons in a fluidized bed of polymer and catalyst, and to the preparation of catalyst suitable for use in such a process.

The polymerization is carried out in vapor phase in a fluidized bed of polymer particles. The fluidized bed is maintained by an ascending stream of gas. The ascending gas may consist entirely of the monomer hydrocarbon or hydrocarbons or may contain an inert diluent gas. As is known, fluidized beds provide the advantage of uniform reaction conditions and easy removal of heat. Operation of fluidized beds of solids is well known, but for a more detailed description of fluidized beds and the methods by which they are obtained, reference may be made to the British patent specification 666,529.

In the process according to this invention, the fluidized bed contains both polymer particles and catalyst particles. The catalyst consists of at least two components: (a) one or more trihalides of titanium and/or vanadium, and (b) one or more organo-aluminum compounds containing aluminum linked to alkyl and/or alkoxy groups.

A process for polymerizing olefinically unsaturated hydrocarbons in a fluidized bed of polymer particles already formed, which contains a catalyst consisting of one or more trihalides of titanium and/or vanadium and one or more aluminum alkyl compounds and prepared in the presence of solid inert diluent is described in a co-pending patent application of Engel et al., U.S. Serial No. 105,543, filed April 26, 1961. Engel et al. describe a procedure in which the polymerization is effected continuously, catalyst being continuously fed in. The catalyst is prepared in a separate chamber by mixing trihalide of titanium and/or vanadium with the organo-aluminum compound with special precautions, including addition of a solid, inert diluent.

One of the difficulties in devising practical processes for polymerizing propylene or similar olefins in vapor phase in fluidized beds has been preparation of catalysts suitable for such a process. It has been found that excessive particle size of the transition metal halide may have a pronounced adverse effect on particle size distribution of polymer and hence on its fluidizability. Various means have been devised for obtaining suitable catalysts, including the use of substantial amounts of solid supports, such as silica, or prolonged grinding of catalyst components. It has now been found that many difficulties of the methods heretofore known for preparing catalysts for fluidized bed polymerization of olefins are obviated by preparing at least the reduced transition metal halide component of the catalyst as finely divided solid particles suspended in paraffins of no more than four carbon atoms per molecule by reducing the higher halide in suspension in such paraffin. Heretofore it had been suggested to carry out such reduction in a medium boiling no lower than isopentane, apparently because temperatures higher than the critical temperature of lower paraffins might be reached during the reduction, and no advantages were thought to be obtained by using such lower paraffins. It has now been found that use of paraffins of no more than four carbon atoms per molecule provides a pronounced advantage in the fluidized bed polymerization method, in that such paraffins do not adhere to a significant extent to the polymer product whereas the higher hydrocarbons do adhere sufficiently that special stripping or steaming is required for their removal. It has also been surprisingly found that excellent catalysts of suitable fine particle size are prepared when the reduction, such as of $TiCl_4$ to $TiCl_3$ by reaction with aluminum triethyl, is carried out in paraffins of four or less carbon atoms per molecule in supercritical phase, i.e., at temperatures and pressures above the critical values for the respective hydrocarbon.

According to this invention, trihalide of titanium or vanadium is introduced into the polymerization chamber in the form of a suspension in one or more alkane hydrocarbons having at most 4 carbon atoms in the molecule. The trihalides are previously produced in the medium consisting of these hydrocarbons by reduction of tetrahalides of titanium or vanadium.

The invention may therefore be defined as a process for polymerizing olefinically unsaturated hydrocarbons in vapor phase, in contact with polymer particles that have been formed from these olefinically unsaturated hydrocarbons and that are kept in the fluidized state by an ascending stream of gas, with the aid of catalysts consisting of one or more trihalides of titanium and/or vanadium and one or more aluminum alkyl and/or aluminum alkoxy compounds, the trihalides of the metals concerned being prepared by reduction of tetrahalides in a separate reaction chamber, characterized in that the reduction is effected in a medium consisting chiefly of one or more alkane hydrocarbons having at most 4 carbon atoms in the molecule, and in that the trihalides are conveyed to the polymerization chamber suspended in said hydrocarbons.

The preferred alkane hydrocarbons used in catalyst preparation in the process of this invention is propane, but the butanes, ethane, or methane can be used.

Temperatures in the catalyst preparation step are in the range from 50° to 250° C. Temperatures above the critical temperature of a given $C_4$ or lower hydrocarbon will often be required for the trihalides to be produced in the desired modifications at a practical rate. Thus, reduction temperatures of at least 100° C. are generally preferred. For the conversion of titanium tetrachloride into the purple modification of titanum trichloride, temperatures of at least 135° C. are necessary and of at least 155° C. desirable.

Solid trihalides are easily suspended in an alkane hydrocarbon medium if its density is of the order of magnitude of the density of liquid. At temperatures above the critical temperature and up to, say 250° C., the density of $C_4$ or lower paraffins is generally sufficient at pressures equal to, or of the same order of magnitude as, the critical pressure. Pressures above the critical pressure and up to five times as much as the critical pressure are recommended. Pressures between 80 and 150 atm. abs. are generally preferred.

In reducing the tetrahalides to trihalides under the conditions described, it has proved possible to cause the trihalides to be formed in a very finely divided state which produced relatively stable, uniform suspensions at a hydrocarbon density as low as 0.1 to 0.2.

In the form of uniform suspensions, given quantities of the trihalides can easily be measured out. This is very important in controlling the progress of the polymerization. These suspensions can be stored for a considerable time without difficulty.

For the reduction of tetrahalides of titanium or vanadium to trihalides, various reducing agents can be used. The aluminum alkyl compounds preferably used are the aluminum trialkyl compounds, though aluminum dialkyl halides may also be used. A mixing ratio of tetrahalide and aluminum alkyl compound is recommended at which about one, for instance 0.6 to 1.4, equivalent of alkyl is available per molecule of tetrahalide; thus, it is preferable to use about a third of a molecule of aluminum trialkyl per molecule of tetrahalide.

The presence of a large excess of aluminum alkyl compound during the reduction step may result in the reduction proceeding too far, for instance to dihalides. For this reason it is preferred to add aluminum alkyl compound gradually to tetrahalide. As a rule, crystalline trihalide formed during the reduction is then fairly resistant to further reduction.

The concentration of trihalide in the hydrocarbon may vary widely. Generally, this concentration is between 0.1 and 1.0 mole per liter.

The aluminum-organic polymerization catalyst component can be added to the suspension of the trihalide in the hydrocarbon. As a rule, before the aluminum-organic compound that has the function of the second catalyst component is added to the trihalide suspension, this suspension will be cooled down from the reduction temperature to that at which polymerization is carried out or lower, for instance, to room temperature. In this manner trihalide and the aluminum alkyl compound used as the second component can be stored together. It is, however, also possible to introduce the suspension of the trihalide and the second catalyst component into the polymerization chamber separately. The aluminum alkyl or alkoxy compound can then be passed into the polymerization chamber as a vapor, if desired diluted with an inert gas such as nitrogen or an inert hydrocarbon of up to four carbon atoms.

The ratio of trihalide to aluminum compound used as the second catalyst component in the polymerization reaction may be greatly varied. Usually, the molar titanium:aluminum ratio is between 0.1 and 10.

The aluminum alkyl compounds used as the reducing agent or as second catalyst component may be, besides aluminum trialkyls, compounds in which the aluminum is linked to one or two alkyl groups and to two, or one halogen or alkoxy groups, respectively.

The alkyl groups in the aluminum compound may be of varying numbers of carbon atoms, and may be branched or unbranched. As a rule the alkyl groups of the aluminum compounds contain from 2 to 12 carbon atoms; alkyl groups having two to five carbon atoms are preferred; ethyl groups being the most preferred. The halogen atoms in the aluminum alkyl compounds, as well as those in the halides of titanium or vanadium, are preferably chlorine or bromine, most preferably the former.

Aluminum trialkyls, dialkyl halides, dialkyl alkoxides, alkyl dihalides, and alkyl dialkoxides in which the akyl and alkoxy groups have 2 to 12 carbon atoms are well known as components of low pressure polymerization catalysts. The dialkyl halides are preferred in the production of polypropylene and the like. Alkyl dihalides generally require addition of a further catalyst component, as is well known to those skilled in this art. Alkoxides are particularly suitable for use in copolymerization. Among the more frequently used aluminum alkyls are aluminum triethyl, aluminum diethyl chloride, aluminum diethyl ethoxide, aluminum triisobutyl, aluminum diisobutyl chloride, and aluminum diisobutyl isobutoxide. Corresponding compounds with other $C_2$ to $C_{12}$ alkyl and alkoxy groups are available or can be made, and are similarly useful.

The preparation of the catalyst components, their storage and transport, like the polymerization itself, should be carried out as far as possible in the absence of oxygen and water.

The olefin polymerization is generally carried out between 0° and 100° C. and preferably between 40° and 80° C. Exceptionally, however, polymerization temperatures above 100° C. or below 0° C. may be applied. The pressure during polymerization may be greatly varied. Atmospheric pressure is possible. Superatmospheric pressures in the range from 1 to 50 atm. abs. are conducive to polymerization. Subatmospheric pressures may also be suitable, however.

The ethylenically unsaturated hydrocarbons suitably polymerized according to this invention are alpha olefins which can be polymerized in vapor phase at suitable temperatures in the range up to 100° C., and include, for example, ethylene, propylene, 1-butene, and 4-methyl-1-pentene; however, conjugated dienes such as butadiene, isoprene, or piperylene may also be polymerized, e.g., in copolymerization. The process may be a homopolymerization or a copolymerization of mixtures of two or more olefinically unsaturated monomers.

Although the polymerization as claimed can be performed batchwise, continuous operation is preferred. In a continuous process, olefinic hydrocarbon, catalyst, and/or the separate components thereof are continuously fed into the polymerization reactor and polymer, catalyst and inert hydrocarbon are discharged from the reactor.

At the start of the polymerization, a fluidized bed is prepared in the polymerization reactor with the aid of polymer previously produced. When no previously produced polymer is available the fluidized bed can also be started with some other finely divided substance instead, for instance, with common salt. In continuous operation this is then gradually replaced by polymer produced and it can later easily be removed by washing it from the product.

The concentration of titanium or vanadium in the fluidized bed is generally between 0.01 and 1%, calculated as metal, based on the weight of polymer in the bed.

Polymer is recovered from the reaction mass by withdrawing a portion of the powder from the reactor and separating the solids by conventional solids recovery means, such as cyclones and/or filters. The solids may be treated for catalyst killing and removal by conventional means, well known to the art, such as washing with alcohol, alcohol plus an acid such as HCl, or the like. It has been found that catalyst may be deactivated by a purely vapor phase treatment of the polymer, e.g., by treating the powder suspension of catalyst and polymer with superheated steam and then with air. The deactivated catalyst remains in the polymer, but does not exert any significant deleterious effects. It is also possible to deactivate the catalyst in the powdered suspension by contact with a gaseous HCl-air mixture, followed by washing such as with dilute acid and water. All of these methods are simplified by the absence of $C_5$ or higher hydrocarbons, such as would be present if a conventional $TiCl_3$ or $VCl_3$ slurry were employed as source of catalyst.

*Example 1*

PREPARATION OF A SUSPENSION OF TiCl₃ IN PROPANE

In an autoclave from which oxygen and water vapor have been carefully removed, the following are mixed at room temperature:

97 mmoles of $TiCl_4$
400 ml. of liquid propane
38 mmoles of aluminum triethyl

While the mixture is stirred at a rate of 500 r.p.m., the temperature is raised to 170° C. and then kept constant at that level for 1 hour. The pressure at this temperature is about 100 atm. abs. $TiCl_3$ is formed in the purple modification.

The suspension obtained is cooled down to room temperature, as a result of which the propane returns from the supercritical state to the liquid state. The suspension is then diluted with propane until the concentration of $TiCl_3$ is 100 mmoles per liter.

POLYMERIZATION OF PROPYLENE

To the suspension of $TiCl_3$ in propane, aluminum diethylchloride is added until the molar ratio of $Al(C_2H_5)_2Cl : TiCl_3$ is as 3:1. The mixture is stirred enough to keep it homogeneous.

The polymerization is carried out in a vertical cylindrical reactor having a length to diameter ratio of 20:1. In the bottom there are openings for feeding propylene; in the side a catalyst feed opening for introducing the catalyst; and at a level 2.5 diameters up a discharge opening for the polymer.

37.5 g. of polymer that had been prepared in a previous experiment is placed in this reactor. Propylene is fed in at a rate to secure a linear velocity, measured across the diameter of the reactor, of 15 to 20 cm./s., the polymer thus being fluidized. Before being passed into the reactor, the propylene is heated to 85° C. The propylene pressure in the reactor is raised to 5 atm. abs. The suspension of $TiCl_3$ in propane, in which the molar ratio of $Al(C_2H_5)_2Cl:TiCl_3$ is 3:1, is added at a rate of 10 ml. per hour.

Under these conditions propylene is polymerized at 85° C. at a rate of 12.5 grams per hour. An equal quantity per hour leaves the reactor through the discharge opening. The withdrawn mixture is contacted, for example, with a gaseous mixture of HCl and air to kill the remaining active catalyst and separated to recover a solid phase. The solids are washed with dilute HCl and water; washed solid polymer is recovered. The product has an I.V. (intrinsic viscosity) of 3.3 dl./g., or an LVN (limited viscosity number) of 3.8.

In larger reactors, the propylene feed need not be preheated.

Example 2

The procedure of Example 1 is repeated with substitution of n-butane for propane in the catalyst preparation step. The catalyst properties are essentially the same as in Example 1 and equally good results are obtained in the polymerization step.

Substitution of isobutane as diluent in the catalyst preparation also leads to similarly good results.

Example 3

A suspension of $TiCl_3$ is prepared as described in Example 1.

CO-POLYMERIZATION OF ETHYLENE WITH PROPYLENE

To a suspension of $TiCl_3$ in propane, $(C_2H_5)_2AlOC_2H_5$ is added until the ratio of $(C_2H_5)_2AlOC_2H_5:TiCl_3$ is 3:1. The mixture is stirred to maintain the suspension.

For the polymerization, a reactor is employed as described in Example 1, except that the discharge opening for the copolymer is at a level of 10 diameters above the bottom. 105 g. of previously produced copolymer is placed in the reactor.

A mixture of equal volumes of ethylene and propylene is fed in at a rate to secure a linear velocity in the reactor of 20 to 25 cm./s. The temperature of the gas mixture passed in is 85° C., the pressure of the gas mixture in the reactor 5 atm. abs. The catalyst mixture is fed in at a rate of 10 ml. per hour.

The rate of production of the copolymer is 35 g. per hour. The I.V. of the product is 3.5 dl./g.

Example 4

A suspension of $TiCl_3$ is prepared as in Example 1.

POLYMERIZATION OF PROPYLENE

Propylene is polymerized in the vessel and at the condition essentially as described in Example 1, except that the catalyst components are separately fed to the vessel and the process is scaled up by a factor of 10. The $TiCl_3$ slurry is fed at the rate of 100 ml. per hour, i.e., 10 mmoles of $TiCl_3$ per hour. At the same time, aluminum diethyl chloride is separately added at the rate of 30 mmoles per hour. The results are essentially as in Example 1.

The substitution of $VCl_4$ for $TiCl_4$ in the catalyst preparation step of Example 1 leads to a slurry of $VCl_3$ which is a suitable substitute for the $TiCl_3$ slurry in Example 3.

The substitution of ethylene for propylene in Example 1 leads to production of high density linear polyethylene.

This invention is an improvement in a fluidized bed method for olefin polymerization. The improvement is in the catalyst preparation step, but exerts its influence on the total process, including product recovery. Numerous modifications of this invention will occur to the person skilled in this art, and the invention is not intended to be limited to the examples, which are for the purpose of illustrating preferred methods of carrying out the invention.

I claim as my invention:

1. A process for the production of polypropylene which comprises contacting propylene in a polymerization zone, in vapor phase, with a fluidized bed of powdered polypropylene and a catalyst consisting essentially of titanium trichloride and aluminum diethyl chloride in a mol ratio between 0.1:1 and 10:1, wherein
    (1) said titanium trichloride is prepared in a separate catalyst preparation zone by contacting (a) titanium tetrachloride with (b) about one third mole of aluminum triethyl per mole of titanium tetrachloride, in (c) a propane reaction medium, (d) at reducing conditions including a temperature between 135° and 250° C. and a pressure at least equal to the critical pressure of propane, and
    (2) the resulting titanium trichloride is introduced into said polymerization zone in suspension in propane,
    (3) said aluminum diethyle chloride is combined with said titanium chloride at a temperature between 40° and 80° C., and
    (4) polypropylene is recovered from the polymerization zone.

2. An olefin polymerization process comprising contacting an alpha olefin in a polymerization zone, in vapor phase, with a fluidized bed of polymer product and a catalyst consisting essentially of a compound selected from the group consisting of trihalides of titanium and vanadium, and a stoichiometric excess, based on said trihalide, of an aluminum alkyl compound, wherein
    (1) said trihalide is prepared in a separate catalyst preparation zone by contacting (a) a corresponding tetrahalide with (b) an aluminum alkyl reducing agent, in (c) a medium consisting of an alkane of 1 to 4 carbon atoms per molecule, (d) at reducing conditions, including a temperature in the range from 50° to 250° C. and a pressure at least equal to the critical pressure of said alkane,
    (2) the resulting trihalide is introduced into said polymerization zone in suspension in said hydrocarbon medium,
    (3) said aluminum alkyl catalyst compound is combined with said trihalide at a temperature not substantially exceeding the polymerization temperature, and
    (4) polymer is recovered from said polymerization zone.

No references cited.